(No Model.) 3 Sheets—Sheet 2.

A. R. MOORE.
FIRE ESCAPE.

No. 376,807. Patented Jan. 24, 1888.

Witnesses.
J. C. Jennings.
Hughes Lyphen.

Inventor.
Andrew R. Moore
by Huggett & Smith
his Attys (No Model.) 3 Sheets—Sheet 3.
A. R. MOORE.
FIRE ESCAPE.
No. 376,807. Patented Jan. 24, 1888.
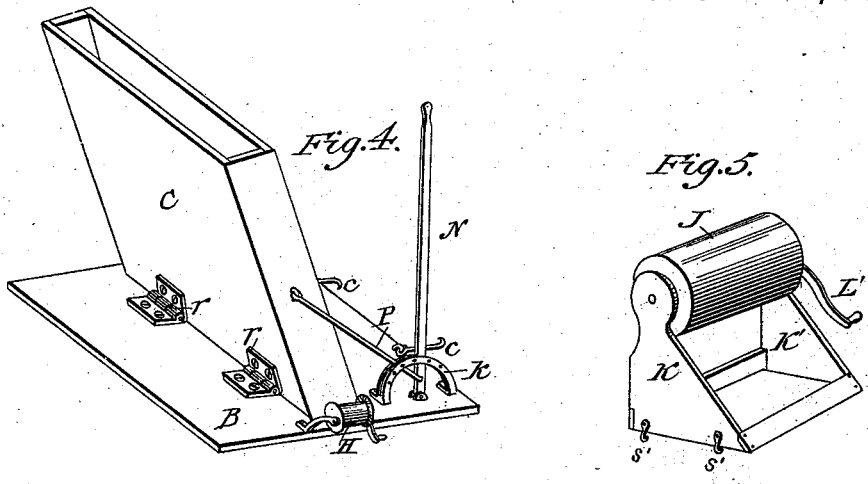
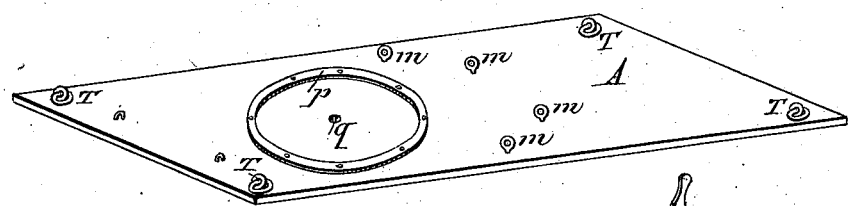

UNITED STATES PATENT OFFICE.

ANDREW R. MOORE, OF CHARLOTTE, MICHIGAN.

FIRE-ESCAPE.

SPECIFICATION forming part of Letters Patent No. 376,807, dated January 24, 1888.

Application filed February 17, 1887. Serial No. 227,971. (No model.)

*To all whom it may concern:*

Be it known that I, ANDREW R. MOORE, a citizen of the United States, residing at the city of Charlotte, in the county of Eaton and State of Michigan, have invented new and useful Improvements in Fire-Escapes, of which the following is a specification.

My invention relates to improvements in fire-escapes in which a rotary folding rack is used for hoisting the ladder, pivotally secured to a platform and mounted upon wheels; and the objects of my improvements are, first, to provide a ready and easy exit from the roof or windows of a building in case of fire; second, to facilitate the raising of ladders in case of emergency; third, to readily adjust the ladder to any desirable height. I attain these objects by the mechanism illustrated in the accompanying drawings, in which—

Figure 1:
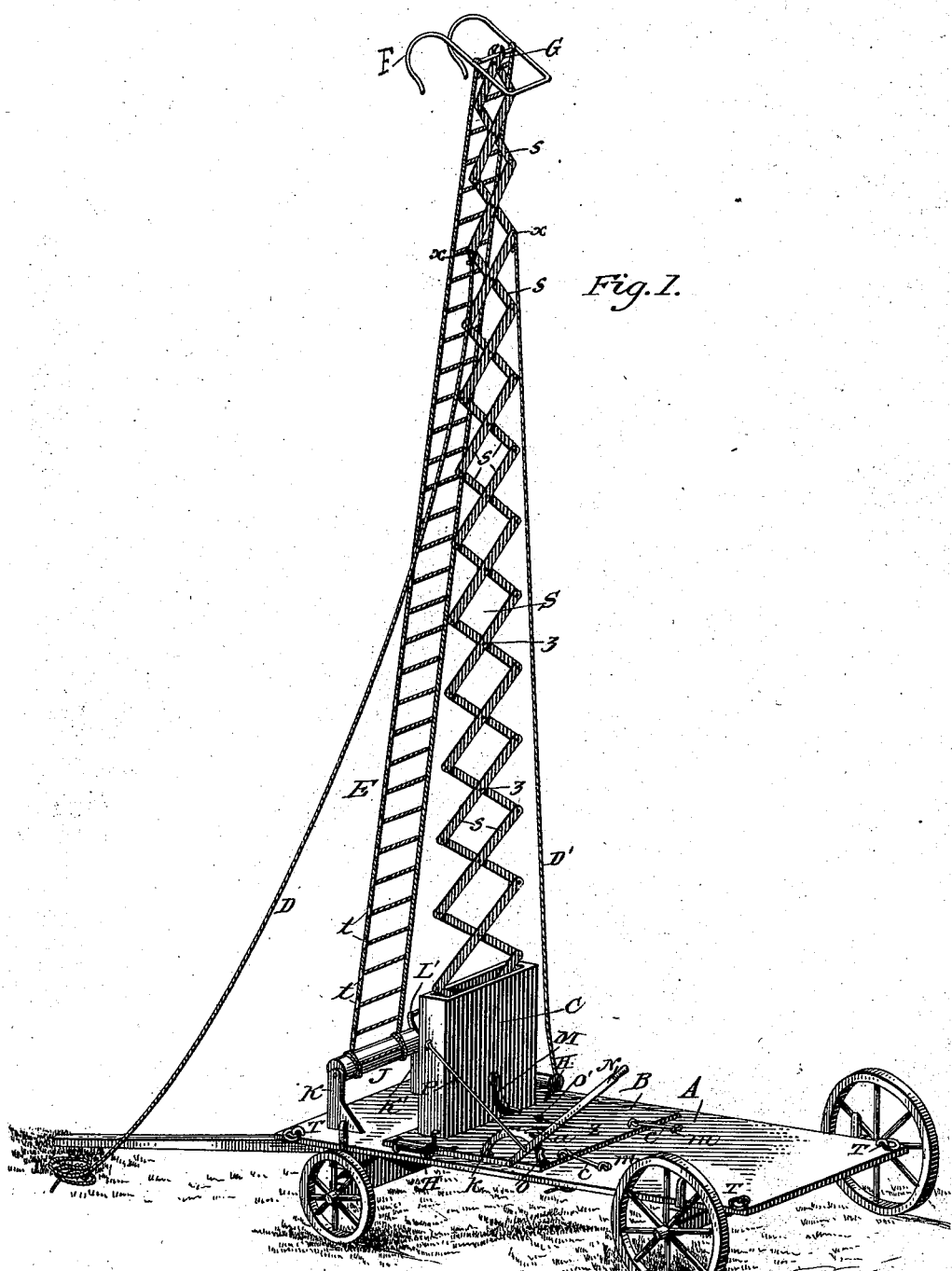
Figure 2:
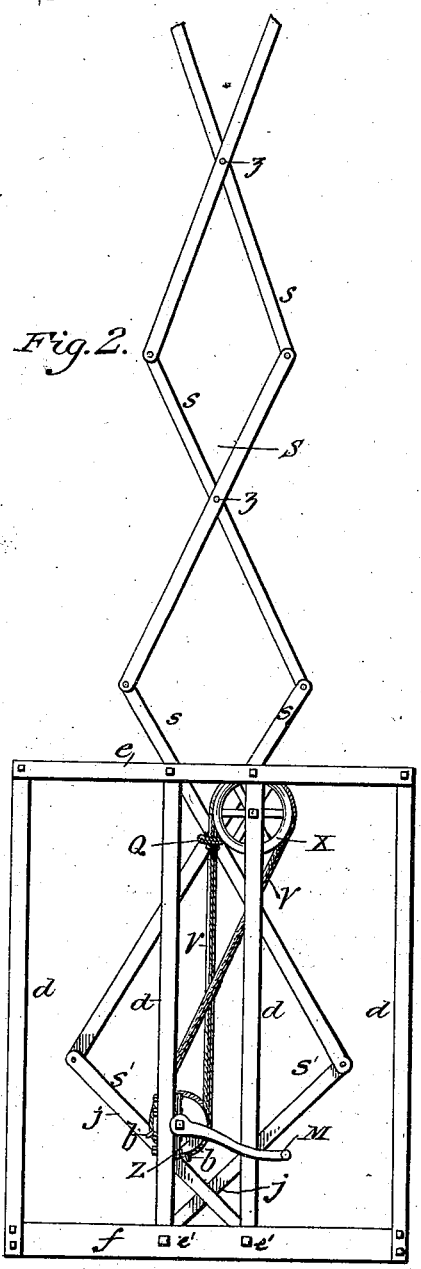
Figure 3:
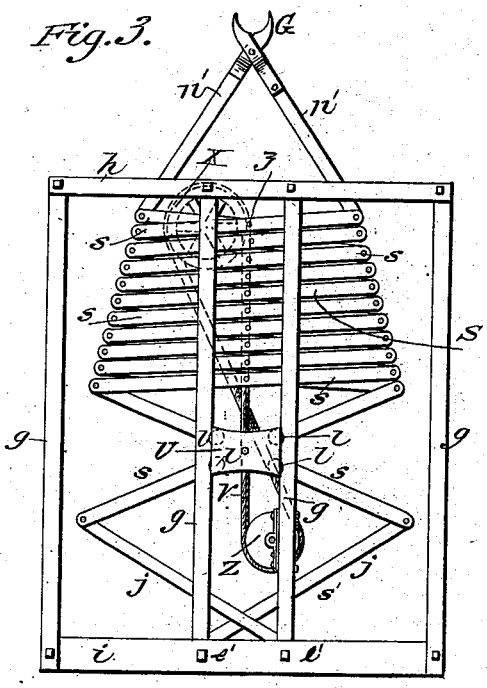

Figure 1 is a detailed view in perspective of the entire machine as mounted on a truck or wagon. Fig. 2 is a front view of the pulleys and rope, showing the preferable device used in raising the folding rack. Fig. 3 is a rear view of the folding rack. Fig. 4 is the turning table. Fig. 5 is a view of the roller. Fig. 6 is the platform. Fig. 7 is a bolt and washers. Fig. 8 is a numbered brad. Fig. 9 is a looped staple. Fig. 10 is a sliding block. Fig. 11 is a jack. Fig. 12 is a key, and Fig. 13 is a clasp.

Similar letters refer to similar parts throughout the several views.

The platform A is constructed of good substantial planks of a convenient length for mounting on trucks or a wagon, and wide enough to extend to the ends of the turning table B. In the center of the platform A, Fig. 6, is bolted the iron circle $p$, to facilitate turning the rotating table B, and in the center of the circle $p$ a hole, $q$, is bored, through which the bolt passes for holding on the turn-table B, and around which the turn-table B turns. The staples $m\ m\ m\ m$ are driven into the platform A at a proper position to hold the hooks $c\ c$ of the turn-table B, so that when the turn-table B is turned in any position it may be rigidly secured to the platform A by hooking the hooks $c\ c$ into the staples $m\ m\ m\ m$. The platform A has a ring and staple, T, in each corner, to which a guy-rope may be tied in case the trucks are found to tip.

The turn-table B is also constructed of good substantial planks, and in the center of which is a hole, $o'$, through which a bolt passes, which forms the pivotal point around which the rotating table B turns. To each end of the turn-table B is fastened a spool, H, for receiving the guy-rope D when the rack S is closed. The turn-table B is provided with hooks $c\ c$, which hook into the staples $m\ m\ m\ m$ of the platform A.

The case C is made of plain boards nailed onto the frame $d\ d\ d\ d$ and $g\ g\ g\ g$, Figs. 2 and 3, and is fastened onto the turn-table B by means of two hinges, $r\ r$, on the back lower edge, Fig. 4. The rod P connects the case C to the lever N. The lever N is connected at one end to the turn-table B and passes up through the jack $k$, as shown in Fig. 11. The case C may be operated backward and forward by one lever N, or, if desired, another jack, $k$, may be bolted to the other side of the turn-table and a lever N used on both sides of the case C. The case C is of any desired width and height to admit the folding rack S. A frame for the case C is made out of scantling of any desired size in thickness by first taking two bed-pieces, $f\ i$, and connecting them by intermediate cross-pieces to form a suitable width for the case C. Upon this base the upright pieces $d\ d\ d\ d$ and $g\ g\ g\ g$, Figs. 2 and 3, are erected and bolted at the bottom to the sills $f$ and $i$ and at the top to the plates $e\ h$. The two center standards $d\ d$, Fig. 2, support the pulley-wheel $x$ and one end of the roller Z, while the center standards $g\ g$ carry the sliding block U. The roller Z is provided with a crank and is fastened at both ends to the frame-pieces $d$ and $g$ of the case C, while the pulley-wheel $x$ is secured only to the single upright $d$.

The folding rack S is constructed of slats $s\ s\ s\ s$, of any suitable thickness having sufficient strength to lift the upper ones. There will be no need of using heavy wood for the slats $s\ s\ s\ s$, as the strain will come upon the bolts which hold the slats together, instead of upon the slats themselves. Any particular length of slats can be used, but as a convenient size for building a rack to open from seventy-five to one hundred feet high the first piece after the two bottom pieces should be about eight feet long, and each next succeeding piece four inches shorter, as shown in Fig. 3, and of one and one-half inch thick. The slats are made of unequal length, in order to procure a greater lifting-power and rapidity in movement. Each slat has a hole bored through its center and one at each end. On the top of the folding rack is the clasp G, made of iron, bolted in the center. Each part of the clasp has a hole in the lower end for bolting onto the top of the short slats $n'$ $n'$ on top of the folding rack, as shown in Fig. 3. The looped staple L is constructed of two pieces of iron bent outward in the center and connected at the ends. Each end has a ring into which the rope V may be tied. In the center are holes for admitting a bolt. This looped staple L may be used in the place of a ring-bolt in holding the two bottom slats S' S' together by placing the slats S' S' through the opening between the iron sides of the looped staple L and having the slats S' S' cross each other. Then the rope V, tied into the rings at each end of the staple L, will draw the staple L up and down by winding and unwinding the rope V around the roller Z. The looped staple L, standing perpendicular, is thus made to serve the purpose of a double clevis, by means of which the two bottom slats S' S', Fig. 2, are held together at their center at Q by passing an ordinary bolt through the holes in the sides of the looped staple L and the slats S' S' crossing each other, as just described, between the sides of the looped staple L. One end of the rope V, running up over the pulley $x$, is tied in the top ring of the looped staple L, and the end of the rope running downward is tied into the lower ring of the looped staple L.

The sliding block U moves between the two center standards $g$ $g$. (Shown in the rear view of the folding rack S, Fig. 3.)

Two rollers, $l$ $l$, are placed in each side of the block U to prevent friction, and a hole is bored through the center for a bolt. The jack $k$ is made of iron, with a footing to bolt it onto the turning table B. The circular or crowning part of the jack $k$ is split, so as to allow the lever N to pass down through between the sides and hook into a staple between the footings, as shown in Fig. 4.

Holes are drilled through the circular part of the jack $k$ for the pin $v$ to block the lever N. The roller J is a wooden cylinder mounted on the frame K K', with a crank, L', at one end for turning the roller J, around which the ladder E is wound. Any kind of a ladder, either rigid or flexible, may be used; but the most preferable is a rope ladder, E, or a common ladder, which is not shown in the drawings. A rope ladder, E, is light, easy to handle, and does not catch the wind, and is the most preferable, as a wooden ladder is heavy and a canvas ladder is difficult and uncertain to handle in a wind-storm. When a rope ladder is used, a brad, $t$, attached at intervals of one foot or more apart, may be used to indicate the height to which the ladder is raised. On one end of the ladder E is tied the hooked bail F, made of iron and having a cross-piece in the center. The sides of the bail F extend far enough in the rear to make weight enough to keep the hooks elevated, so as to be readily hooked over window-sills, fire-walls, or beams. Near the top of the folding rack S are attached two guy-ropes, D D, suspended loosely therefrom and extending to the ground to assist in steadying the top of the folding rack S in case of wind-storms or when the trucks set unevenly upon the ground.

In constructing my device I first mount the platform A upon trucks, which form a carriage and a convenient means of moving the fire-escape from one place to another. I then bolt the jack $k$ onto the turn-table B by passing bolts through the holes in the feet $x'$ $x'$. If found more desirable, a hook, $a$, attached to the lever N, may be used with a ratchet-wheel, $o$, as shown in Fig. 1, instead of the jack $k$, since the object sought to be accomplished is to provide a brake for the lever N. I next bolt the turn-table B to the platform A by a bolt, $z$, passing through the hole $o'$ in the center of the turn-table B and through the hole $q$ in the platform A. The bolt $z$, (see Fig. 7,) thus passing through the hole $o'$ and $q$ of the turn-table B and the platform A, forms a pivotal point around which turns the turn-table B. To each end of the turn-table B are secured the spools H and H', suppressed by means of braces extending from the edges far enough to admit of a crank for turning the spool H. Upon these spools H and H' are wound the guy-ropes D and D' when the folding rack S is closed. To the bed-pieces $f$ $i$ of the frame, within the case C, I bolt the two short bottom slats $j$ $j$ at $e'$ $e'$, and place the short slats $j$ $j$ across each other disconnectedly under the roller Z. To the top ends of the slats $j$ $j$ are bolted the bottom ends of the long bottom slats S' S', also crossing each other within the looped staple L. The sliding block U is then placed behind the crossing and the center of the two bottom slats S' S', and a bolt, $z$, is placed through the sliding block U, the looped staple L, and the slats S' S'.

The folding rack may also be operated without the looped staple and the sliding block U by simply placing a bolt, Q, having a ring in one end, into which the hoisting-rope V may be tied, through the bottom slats S' S'. The folding rack is then completed by bolting each alternate slat $s$ at its lower end to the next lower slat $s$, and crossing each other, with a bolt, $z$, passing through their center, until any desired height is attained.

On the top two half-slats, $n'$ $n'$, are bolted, with the apex terminating in the folding clasp G. Washers are used on each end of the bolt $z$ used in the centers and ends of the slats $s$ $s$. I now bolt the pulley-wheel $x$ to one of the standards $d$ of the frame within the case C up high enough to allow the slats $s$ $s$ to rise nearly perpendicularly. This pulley-wheel $x$ is bolted to only one of the standards, so that the slats s s will pass up and down between the pulley-wheel x and the back standards g g within the case C, as shown in Fig. 2.

Near the bed-pieces f i, and to the standards d g, standing opposite each other, I bolt the roller Z, constructed either of wood or iron. I next tie the center of the rope V to the ring Q in the bolt holding the center of the two bottom slats S' S' securely, so as not to draw through without raising or lowering the center of the slats s s. Then I place one end of the rope V up over the pulley-wheel x and bring it down obliquely over the rear of the roller Z, giving it several wraps around the roller Z, and secure the end with a staple, b, driven through the end of the rope V and into the roller. The other end of the rope V is brought down perpendicularly from the center Q of the slats S' S' to the roller Z and wound around the roller several times in an opposite direction from the other end, and also having a staple driven through the end of the rope V and into the roller Z, to prevent the roller Z from turning with the rope V. If an iron roller Z is used the ends will be wound around the roller Z the same and tied into staples b b, welded to the roller. To the end of the roller Z is attached a crank, M. The frame e d h g is then covered with boards, giving it the appearance of the case C. The case C is then fastened to the turning table B by means of the hinges r r, bolted to one of the lower edges of the case C and the turn-table B in such a manner as to admit the case C to turn backward and forward on the turn-table B. I next attach the case C to the lever N by means of the rod P, which lever N is fastened at its lower end to the turn-table B. Upon the forward end of the platform A, I fasten the roller J by means of the hooks s' s'. Around the roller J is wound the ladder E, with the bail-piece hooked into the clasp G on the top of the folding rack S.

In operating my device I turn the rotating table B, with the case C attached, so as to throw the ladder in any desired direction and hook it fast to the platform A by means of the hooks c c into the staples m m. I next take hold of the crank M, and by turning raise the rack S, thereby folding the slats perpendicularly together to any desired height. A ratchet-wheel may be used under the crank M on the outside of the case C, if there is found a tendency of the rack S closing when in a perpendicular position. The guy-ropes D D' are now taken hold of, and by moving the lever N backward or forward the rack S is lowered to any angle and the pin v is placed through the jack k in front of the lever N, and holds the rack S in a permanent position. When the proper distance and position of the rack S is found to correspond with the window or fire-wall, then the rack S is moved forward by the lever N and dropped by the crank M at the same time, thereby hooking the bail F into the window or upon the building. The roller J, carrying the flexible ladder E, may be detached readily from the wagon and taken to any desired spot for unwinding the ladder. Also, after placing up one ladder, the machine may be taken away and put up another, as no limit is placed upon the number of ladders used, and each wagon ought to have at least a rope ladder and a canvas ladder. The canvas ladder can be used for lowering or sliding down effects, a convenient mode of making which will be about four feet wide with a rope sewed along each side, permitting it to sag in the center, and which can be used for a chute or slide.

Having thus described my invention, what I claim as new, and desire to secure by Letters Patent, is—

1. In fire-escapes, the folding rack for hoisting the ladder, operated by a rope and pulley and roller, in combination with the oscillating case mounted upon a rotating table bolted to the platform, substantially as set forth and described.

2. In fire-escapes, the folding rack made of slats bolted in the center and ends and attached below to an oscillating case and terminating on the top in a clasp for carrying one end of a ladder and hinged at the bottom to a rotating table bolted pivotally at its center to a mounted platform, substantially as set forth and described.

3. In fire-escapes, the folding rack bolted at its lower end to an oscillating case, which in turn is bolted to a turning table having a spool on each edge and a lever for oscillating the case containing the rack, in combination with a platform to which the turning table is bolted, substantially as set forth and described.

4. In fire-escapes, the folding rack having two guy-ropes attached near its top, bolted to a case attached to a rotating table pivotally connected to a platform, in combination with a ladder, substantially as set forth and described.

ANDREW R. MOORE.

Witnesses:
J. D. PARKHURST,
O. BURCHFIELD.